C. SELLA.
VERTICAL SPINDLE LUBRICATION.
APPLICATION FILED MAY 29, 1913.
1,202,904.
Patented Oct. 31, 1916.
2 SHEETS—SHEET 1.
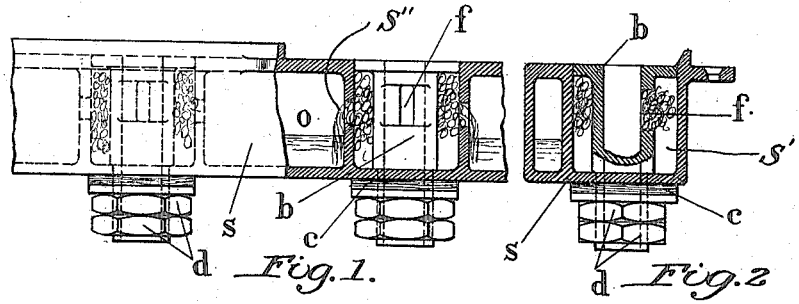
Fig. 3
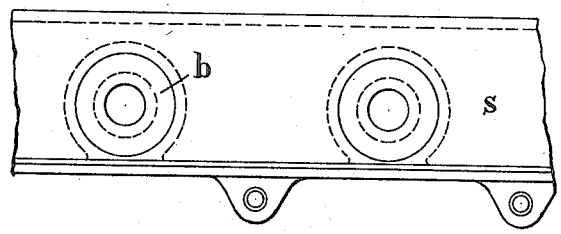
Fig. 4  Fig. 5
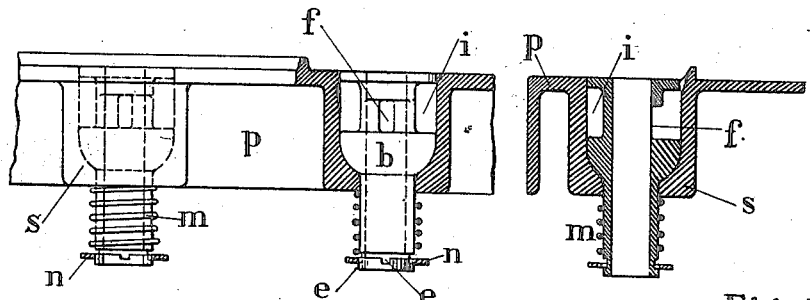
Fig. 6
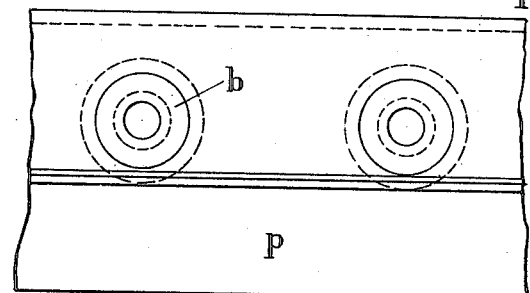
Fig. 7b
Fig. 7
Inventor
Carlo Sella

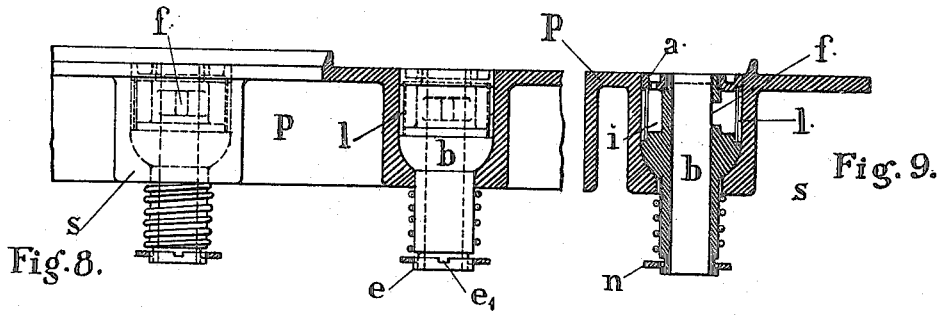
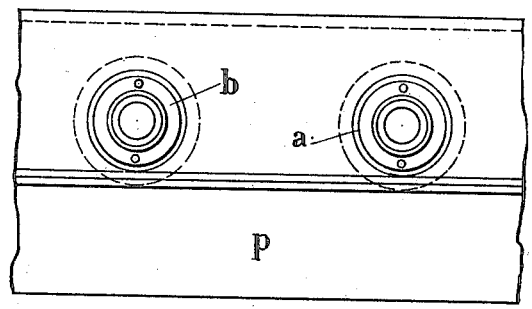
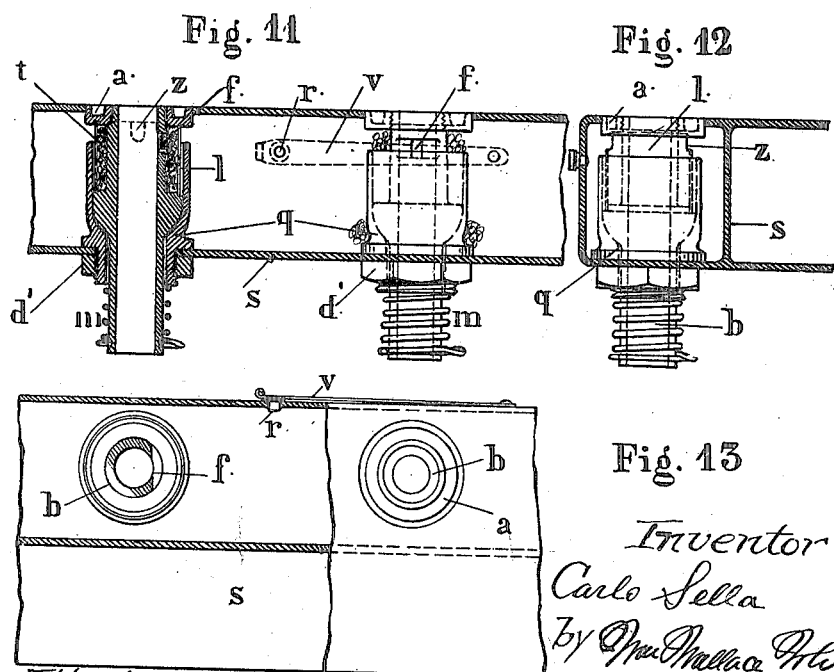

UNITED STATES PATENT OFFICE.

CARLO SELLA, OF TURIN, ITALY.

VERTICAL-SPINDLE LUBRICATION.

1,202,904.  Specification of Letters Patent.  Patented Oct. 31, 1916.

Application filed May 29, 1913. Serial No. 770,755.

*To all whom it may concern:*

Be it known that I, CARLO SELLA, citizen of Italy, residing at Turin, Italy, have invented new and useful Improvements in Vertical-Spindle Lubrication, of which the following is a specification.

This invention relates to an apparatus for automatically lubricating, during rotation, vertical axles of any kind, and particularly spinning, twisting and preparation spindles.

In the accompanying drawings showing several arrangements of the apparatus, Figure 1 is an elevational view part being shown in section for the sake of clearness; Fig. 2 is a transverse sectional view taken through the box; Fig. 3 is a plan view; Figs. 4, 5 and 6 are views similar to Figs. 1, 2 and 3 showing a modified form of the apparatus; Figs. 7 and 7$^b$ are detail views; Figs. 8, 9 and 10 are views similar to Figs. 1, 2 and 3 showing another modification; Figs. 11, 12 and 13 are views similar to Figs. 1, 2 and 3 showing another modification.

As shown in Figs. 1, 2 and 3 the apparatus comprises a reservoir or well S, and boxes $b$ within which the vertical axle is rotatably mounted. The box $b$ is provided with an opening $f$ which exposes a portion of the surface of the spindles or axles. A cotton wick extends in the reservoir S and also engages the exposed portion of the axle thereby continually lubricating the said axle or spindle.

In the Figs. 1, 2, 3 the boxes $b$ are placed in circular chambers S′ formed in the reservoir S and are kept in place by nuts $d$. The chambers are provided at spaced intervals, thus spacing the oil compartments in series therewith, and the wicks extend through openings S″ in the walls of the chambers and through the openings $f$ of the boxes, the boxes being provided or formed with flanges at their upper ends snugly fitting the chambers and lying flush with the top of the reservoir or well. In order to prevent leakage from the reservoir a leather packing $c$ is provided. For the introduction of the oil and the discharge of air holes are formed in the upper portion of the reservoir, which is also fitted with lugs to mount the same on the machine benches.

In the arrangement shown by Figs. 4, 5, 6, 7, each box has its own reservoir and is supported by a plate $p$, the reservoirs being spaced apart and forming chambers for receiving the boxes therein. The box has a slightly different shape from the preceding form, being provided with a spherical bearing which seats in a corresponding cavity in the reservoir so that an air tight joint is formed. Each box is held in place by a spring $m$ which is kept under tension by a ring $n$ provided with lugs $g$ engaging notches $e$, the springs exerting downward tension between the reservoir and rings so as to hold the boxes firmly in their seats. The upper part of the box is recessed at $i$ to receive the cotton wick and lubricant and the opening $f$ communicates with the recess. A corresponding flange is also provided at the top of each box.

In Figs. 8, 9, 10, the box is not formed in one piece, but is provided with a removable upper head or flange $a$ which can be screwed into the body portion of the box keeping in place a thin metallic ring $l$ which surrounds the cotton.

In Figs. 11, 12, 13, the reservoir comprises a single receptacle in which box supports $q$ are fixed by means of nuts $d'$ engaging reduced and exteriorly threaded lower ends of the supports and bindingly engaging or holding the reservoir. The supports have spherical seats to receive the boxes $b$ which have corresponding spherical bases. By this construction slight movement is possible for the adjustment of the bearing box in its position and, besides, they are perfectly tight. The heads or flanges $a$ of the boxes are also removable, and screwed to the body portions so as to keep in its place the ring $l$ which surrounds the cotton wick $t$, and openings $z$ are provided to allow the cotton wick to engage the spindle. The introduction of oil is through the hole $r$ which is closed by a button on the spring $v$ which is pivotally mounted on the reservoir. The springs $m$ are kept in position by elastic forks engaging circular grooves in the box, or by a joint as before described. The reservoir or tank may be secured to the machine by means of lugs.

What I claim is:—

1. In a vertical spindle or axle lubricator, a reservoir adapted to contain oil, said reservoir having a top portion, a box adapted to receive a spindle and having a head at its upper end flush with the top portion, said box being provided with an opening in its wall, means to hold said box under downward tension, and a wick extending into said reservoir and through said opening whereby it will engage the spindle to supply lubricant thereto.

2. In a vertical spindle lubricator, a support having attaching portions and formed at spaced intervals with compartments providing reservoirs, boxes in said compartments and having spindle receiving bearings, said boxes having flanges projecting outwardly from their upper ends to snugly engage the interior walls of the compartments, said boxes projecting downwardly through and from the compartments, means mounted on said downwardly projecting portions to secure said boxes in position, said boxes having openings therethrough and means for supplying lubricant from the reservoirs through the openings to the spindles.

3. In a device of the character described, a reservoir adapted to contain oil, a box adapted to receive a spindle, means for anchoring said reservoir, said box being provided with a spherical bearing in said reservoir, a spherical seat engaged by said bearing, said box being provided with an opening in its wall, and a wick extending into said reservoir and through said opening whereby it will engage the spindle to supply lubricant thereto.

4. In a device of the character described, a reservoir adapted to contain oil, a box adapted to receive a spindle, means for anchoring said reservoir, said box being provided with a spherical bearing in said reservoir, a spherical seat engaged by said bearing, said box being provided with an opening in its wall, a head at the upper end of a box engaging the interior wall of the reservoir, a wick located in said reservoir and extending through said opening to engage the spindle and supply lubricant thereto, means surrounding said wick to retain the same in position and prevent the escape of the lubricant, said box projecting below the reservoir and means operating between the reservoir and the lower end of the projecting portion of the box to hold said spherical bearing firmly against its seat, as and for the purpose described.

5. In a device of the character described, a reservoir adapted to contain oil, a box adapted to receive a spindle, means for anchoring said reservoir, said box being provided with a spherical bearing in said reservoir, a spherical seat engaged by said bearing, said box being provided with an opening in its wall, a head at the upper end of the box engaging the interior wall of the reservoir, a wick located in said reservoir and extending through said opening to engage the spindle and supply lubricant thereto, means surrounding said wick to retain the same in position and prevent the escape of the lubricant, said box projecting below the reservoir, means operating between the reservoir and the lower end of the projecting portion of the box to hold said spherical bearing firmly against its seat, and means for vertically adjusting said box.

In testimony whereof I have signed my name to this specification in the presence of two subscribing witnesses.

CARLO SELLA.

Witnesses:
C. L. FEYLES,
GENVENT BARI.

Copies of this patent may be obtained for five cents each, by addressing the "Commissioner of Patents, Washington, D. C."